United States Patent
Junghans et al.

(10) Patent No.: US 8,190,673 B2
(45) Date of Patent: May 29, 2012

(54) ENFORCEMENT OF OBJECT PERMISSIONS IN ENTERPRISE RESOURCE PLANNING SOFTWARE

(75) Inventors: Uno Junghans, Hellerup (DK); Dean McCrae, Kastrup (DK); Stuart Glasson, Copenhagen (DK); Tsvi M. Reiter, Copenhagen (DK); Jesper Boelsmand, Virum (DK)

(73) Assignee: Microsoft Corporation, Redmond, WA (US)

( * ) Notice: Subject to any disclaimer, the term of this patent is extended or adjusted under 35 U.S.C. 154(b) by 508 days.

(21) Appl. No.: 12/182,967

(22) Filed: Jul. 30, 2008

(65) Prior Publication Data

US 2010/0030845 A1    Feb. 4, 2010

(51) Int. Cl.
G06F 15/16 (2006.01)
G06F 7/00 (2006.01)
G06F 17/30 (2006.01)
G06F 7/04 (2006.01)
G06F 17/00 (2006.01)
G06F 15/173 (2006.01)

(52) U.S. Cl. ............ 709/203; 707/783; 707/784; 726/5; 726/12; 709/219; 709/225

(58) Field of Classification Search .................. 709/203; 717/120, 121; 719/330
See application file for complete search history.

(56) References Cited

U.S. PATENT DOCUMENTS

| | | | |
|---|---|---|---|
| 6,339,826 B2 | 1/2002 | Hayes, Jr. et al. | |
| 7,028,090 B2 | 4/2006 | McBrearty et al. | |
| 7,131,143 B1 * | 10/2006 | LaMacchia et al. | 726/30 |
| 7,203,833 B1 * | 4/2007 | Abadi et al. | 713/167 |
| 7,310,822 B2 | 12/2007 | LaMacchia et al. | |
| 2003/0005117 A1 * | 1/2003 | Kang et al. | 709/225 |
| 2003/0028451 A1 * | 2/2003 | Ananian | 705/27 |
| 2005/0172126 A1 | 8/2005 | Lange et al. | |
| 2005/0193213 A1 | 9/2005 | Johnson et al. | |
| 2006/0010442 A1 * | 1/2006 | Desai et al. | 718/100 |
| 2006/0248034 A1 * | 11/2006 | Soderberg et al. | 707/1 |
| 2007/0073695 A1 | 3/2007 | Conlan et al. | |
| 2008/0028153 A1 * | 1/2008 | Marwinski | 711/130 |
| 2009/0037197 A1 * | 2/2009 | McCrae et al. | 705/1 |

OTHER PUBLICATIONS

Paul, N.; Evans, D.; , ".NET security: lessons learned and missed from Java," Computer Security Applications Conference, 2004. 20th Annual , vol., no., pp. 272-281, Dec. 6-10, 2004.*
Patrick Klinkoff, Engin Kirda, Christopher Kruegel, and Giovanni Vigna. 2007. Extending .NET security to unmanaged code. Int. J. Inf. Secur. 6, 6 (Oct. 2007), 417-428.*

(Continued)

Primary Examiner — Jeffrey R Swearingen
Assistant Examiner — Taylor Elfervig
(74) Attorney, Agent, or Firm — Perkins Coie LLP (57) ABSTRACT

A system and method of enforcing Enterprise Resource Planning ("ERP") software object permissions in a three-tiered architecture is provided. A user connects to the three-tiered architecture via an enhanced client, which connects to a database server via a middle-tier server. The database server stores code and permission information for each database object. When a user connects to the system, the user's permissions are retrieved and stored at the middle-tier server. The user may then access data by instantiating objects at the middle-tier server by compiling and executing code retrieved from the database server. The middle-tier server performs permission checking for accessing database objects and provides environments for executing both managed and unmanaged code. The middle-tier server can perform permission checking for users and objects without accessing the database server.

20 Claims, 6 Drawing Sheets

OTHER PUBLICATIONS

Fay, D.;, "An architecture for distributed applications on the Internet: overview of Microsoft's .NET platform," Parallel and Distributed Processing Symposium, 2003. Proceedings. International , vol., no., pp. 7 pp., Apr. 22-26, 2003.*

"Enterprise Resource Planning Security Technical Implementation Guide," DISA Field Security Operations Developed by DISA for the DoD, ver. 1, rel. 1, Dec. 7, 2006, 34 pages.

Pre-Implementation Guide: SAP GRC Access Control Version 5.2, Document Version 1.1, May 2007, 25 pages.

Megaache, S., et al., "A Role-Based Security Architecture for Business Intelligence," Proceedings of the Technology of Object-Oriented Languages and Systems (TOOLS 34'00), 2000, pp. 295-305.

Sandhu, Ravi S. and Hal Feinstein, "A Three Tier Architecture for Role-Based Access Control," Proc. of 17th NIST-NCSC National Computer Security Conference, Baltimore, Maryland, Oct. 11-14, 1994, pp. 138-149.

* cited by examiner

FIG. 1

FIG. 2 roles 300

| | Role | Object | R | I | M | D | E |
|---|---|---|---|---|---|---|---|
| 304 | Role0 | Object0 | 1 | 1 | 1 | 1 | 1 |
| 305 | Role0 | Object1 | 1 | 0 | 2 | 2 | 1 |
| 306 | Role0 | Object2 | 1 | 2 | 0 | 0 | 0 |
| 307 | Role1 | Object1 | 2 | 0 | 2 | 2 | 0 |
| 308 | Role2 | Object2 | 0 | 0 | 0 | 0 | 1 |

301 = Role column, 302 = Object column, 303 = R I M D E columns

0 = no permission
1 = direct permission
2 = indirect permission users 310

| User0 | Role0 |
|---|---|
| User0 | Role1 |
| User0 | Role2 |
| User1 | Role2 |

ENFORCEMENT OF OBJECT PERMISSIONS IN ENTERPRISE RESOURCE PLANNING SOFTWARE

BACKGROUND

Enterprise Resource Planning ("ERP") software is a type of software used by many companies to plan and manage various business functions, such as budgeting, accounting, human resources, inventory, customer relationships, and so on. ERP software typically provides access to a database from which users and applications may retrieve information related to the various business functions. Users and application resources typically interact with the database via a plurality of database objects. For example, a table object may provide access to a data table while a form object may provide the code necessary for displaying a form that can be used to access data with a table. As another example, a codeunit may provide logic for manipulating the data and objects associated with the database. In addition to the above-mentioned objects, typical database objects may also include reports, records, menusuites, dataports, and XMLports.

ERP software typically manages access (e.g., read, insert, modify, delete, execute) to the various objects through the use of permissions maintained at the database server. The permissions include direct and indirect user permissions and indirect object permissions. Direct user permissions allow a user to access an object directly. For example, if a user has direct insert permission for a table, the user may be able to input data into the table directly through an interface provided by the table object. Indirect permissions allow a user to access one object via another object (the "parent object") by executing logic of the parent object. For example, a form object may provide an interface for manipulating table data by interacting with a table object. If a user has permission to execute the form object and both the user and the form object have permission to access the table object indirectly, a request by the form object to access the table object on behalf of the user can be granted.

When a user connects to the database server, typically through a client, the user's permissions may be retrieved from the database server and stored at the client's computer. When a user attempts to access an object, the user's permissions are checked at the client computer and if the user has the necessary permissions, the object is retrieved from the database and executed at the client. In this two-tiered architecture (i.e., fat clients and a server), access to the various objects is generally managed at a client computer using the permissions retrieved from the database server. Managing permissions at the client computer can create security problems for the ERP software as a user may be able to manipulate the permission information locally and obtain access to privileged data maintained at the database server.

The database objects typically operate in an unmanaged environment in which the source code for the objects is compiled into machine language and executed directly by a CPU. A managed environment, in contrast, provides machine-independent code, such as Common Intermediate Language (CIL) code, formerly known as Microsoft Intermediate Language (MSIL) code, that is executed by a virtual machine, such as Microsoft's Common Language Runtime ("CLR"). At runtime, the virtual machine converts the machine-independent code into instructions compatible for execution by the underlying CPU. A virtual machine allows developers to produce code that can be executed within a number of different operating system environments without being recompiled and also provides various services, such as memory management, security, Just-In-Time compilation, and so on.

SUMMARY

A system and method of enforcing object permissions in a three-tiered architecture while maintaining support for enforcing object permissions in a two-tiered architecture is provided. The three-tiered architecture comprises an enhanced client, a middle-tier server, and a database server. In the three-tiered architecture, a user connects to the system via the enhanced client, which connects to the database server via a middle-tier server. The middle-tier server performs permission checking for accessing objects and provides environments for executing both managed and unmanaged code. Initially, an indication of each object is stored at the database server along with permissions indicating which users and which objects have access to each object. When a user desires to connect to the system via the enhanced client, a request is sent to the middle-tier server, which then forwards the request to the database server. The database server retrieves the permissions stored for the user and sends the retrieved permissions to the middle-tier server, which stores the permissions in unmanaged code. The middle-tier server extracts of the execute permissions and stores them in managed code. Once the user connection is established, the user can access data by requesting object information from the database server and instantiating objects at the middle-tier server. The middle-tier server can perform permission checking for users and parent objects without accessing the database server.

This Summary is provided to introduce a selection of concepts in a simplified form that are further described in the Detailed Description. This Summary is not intended to identify key features or essential features of the claimed subject matter, nor is it intended to be used as an aid in determining the scope of the claimed subject matter.

DETAILED DESCRIPTION

A system and method of enforcing object permissions in a three-tiered architecture is provided. Object permissions are enforced in the three-tiered architecture while supporting object permission enforcement for two-tiered clients (i.e., clients that connect to the database server directly). The three-tiered architecture comprises an enhanced client, a middle-tier server, and a database server. In the three-tiered architecture, a user connects to the system via the enhanced client, which connects to the database server via a middle-tier server.

The middle-tier server performs permission checking for accessing objects and provides environments for executing both managed and unmanaged code. Initially, permissions indicating which users and which objects have access to the various objects are stored at the database server. In addition to storing permissions, the database server also stores an indication of each object. For example, the database server may store source code for each object that can be compiled when an object is to be instantiated. When a user desires to connect to the system via the enhanced client, the enhanced client sends a request to the middle-tier server, which queries the database server for the user's permissions and stores the permissions in unmanaged code. In unmanaged code, the middle-tier server extracts the user's execute permissions and executes a callback function to send the extracted execute permissions to managed code, where they are stored. By transferring and checking user permissions at the middle-tier server instead of the enhanced client, permissions can be checked securely, without the ability to tamper with the permissions in the client. Once the user is connected, the user can access data by instantiating objects at the middle-tier server. To do so, the middle-tier server first determines whether the user has permission to access the object in the manner requested, and if so, requests the object from the database server. The database server, in turn, sends the object's code and permission information to the middle-tier server where it is stored. The code for the object is then compiled and executed in a managed environment. If a user attempts to access an object, the middle-tier server can perform permission checking for both the user and parent objects without accessing the database server.

Figure 1:
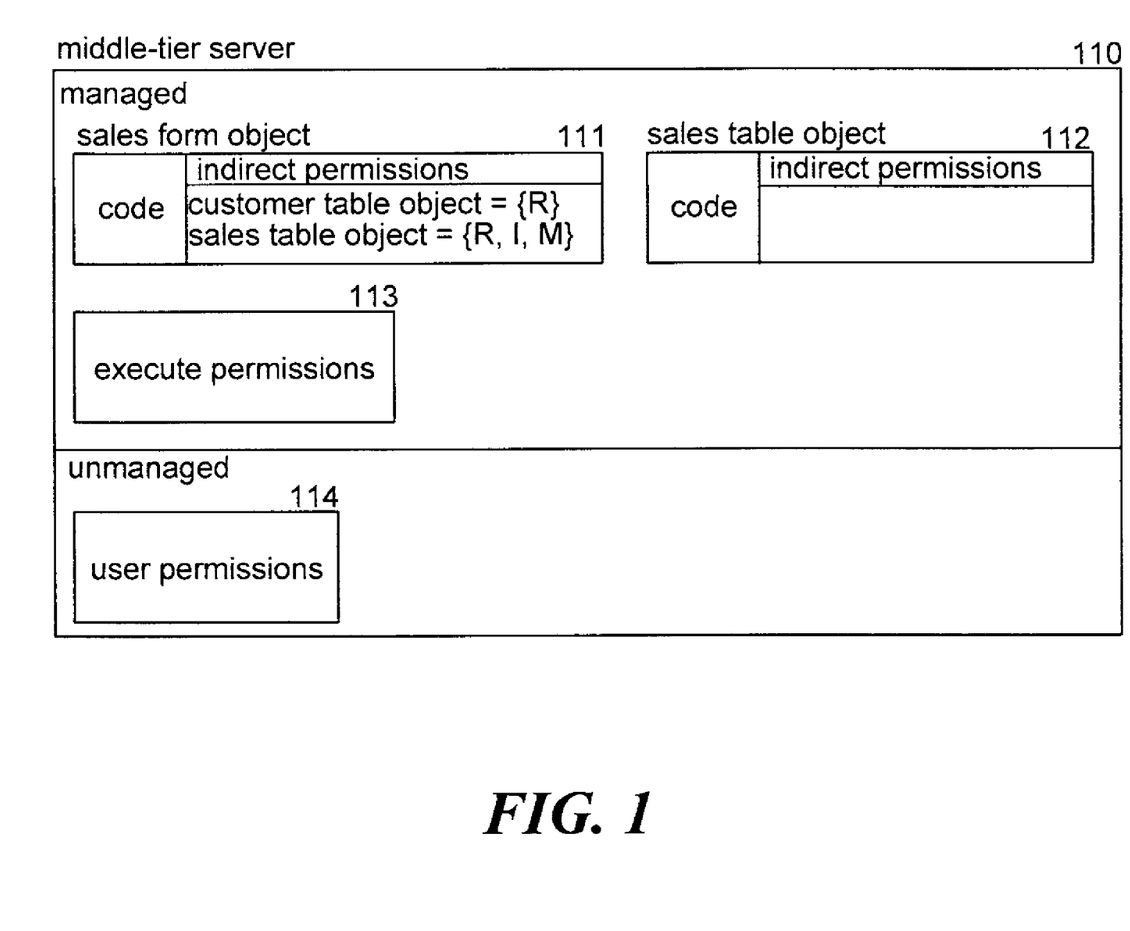
FIG. 1 is a block diagram illustrating a middle-tier server with instantiated database objects.

In some cases, a user may access one object indirectly by invoking logic of another object. For example, a user may use a sales form object to read table data via a table object. To access the table object indirectly, the user needs permission to execute the form object (the "parent" object) and both the user and the form object need indirect permission to access the table object. Furthermore, the table object and the form object need to be instantiated at the middle-tier server. The objects may be instantiated, for example, when the user requests access to the form object. As another example, the form object may be instantiated when the user requests access to the form object and the table object may not be instantiated until the form object attempts to access the table object on the user's behalf. FIG. 1 is a block diagram illustrating a middle-tier server 110 with instantiated database objects sales form object 111 and sales table object 112. Sales form object 111 provides logic for displaying a form that can be used to interact with data stored in a sales table maintained at a database server (not shown) via sales table object 112. Sales form object 111 also includes an indication of the indirect permissions sales form object 111 has with respect to other objects. In this example, sales form object 111 has indirect permission to perform read, insert, and modify accesses with respect to sales table object 112. Similarly, sales table object 112 includes an indication of the indirect permissions sales table object 112 has with respect to other objects. In this example, sales table object 112 does not have permission to access any object indirectly. When a user submits a request to execute the logic for displaying the form associated with sales form object 111, the user's permissions to execute code associated with the sales form object are checked via execute permissions table 113. If the user has permission to execute the code, then the middle-tier server determines whether the user who submitted the request and sales form object 111 have permission to access sales table object 112 indirectly, else the middle-tier server denies the request. The middle-tier server may use user permissions table 114 to check the user's permissions and the indirect permission information stored on the sales form object 111 to check the object's permissions. If the user and sales form object 111 have indirect permissions, the request is granted, else the request is denied. A parent object may pass an object to a third object which the third object may use to access data. For example, codeunit A may instantiate record R and pass R to codeunit B. If B then attempts to access data via R on behalf of a user, the system may need to determine which entities contribute indirect permissions. If the object was passed by reference, then the passing object contributes a portion of the indirect permissions. If the object was passed by value, then the receiving object contributes a portion of the indirect permissions. In either case, the user requesting the indirect access contributes a portion of the indirect permissions. In some embodiments, the system may permit a user with permission to access an object directly to access the object indirectly as well. For example, a user with permission to access table X directly may also invoke the logic of codeunit Y to access table X, provided that codeunit Y has permission to access table X.

Figure 2:
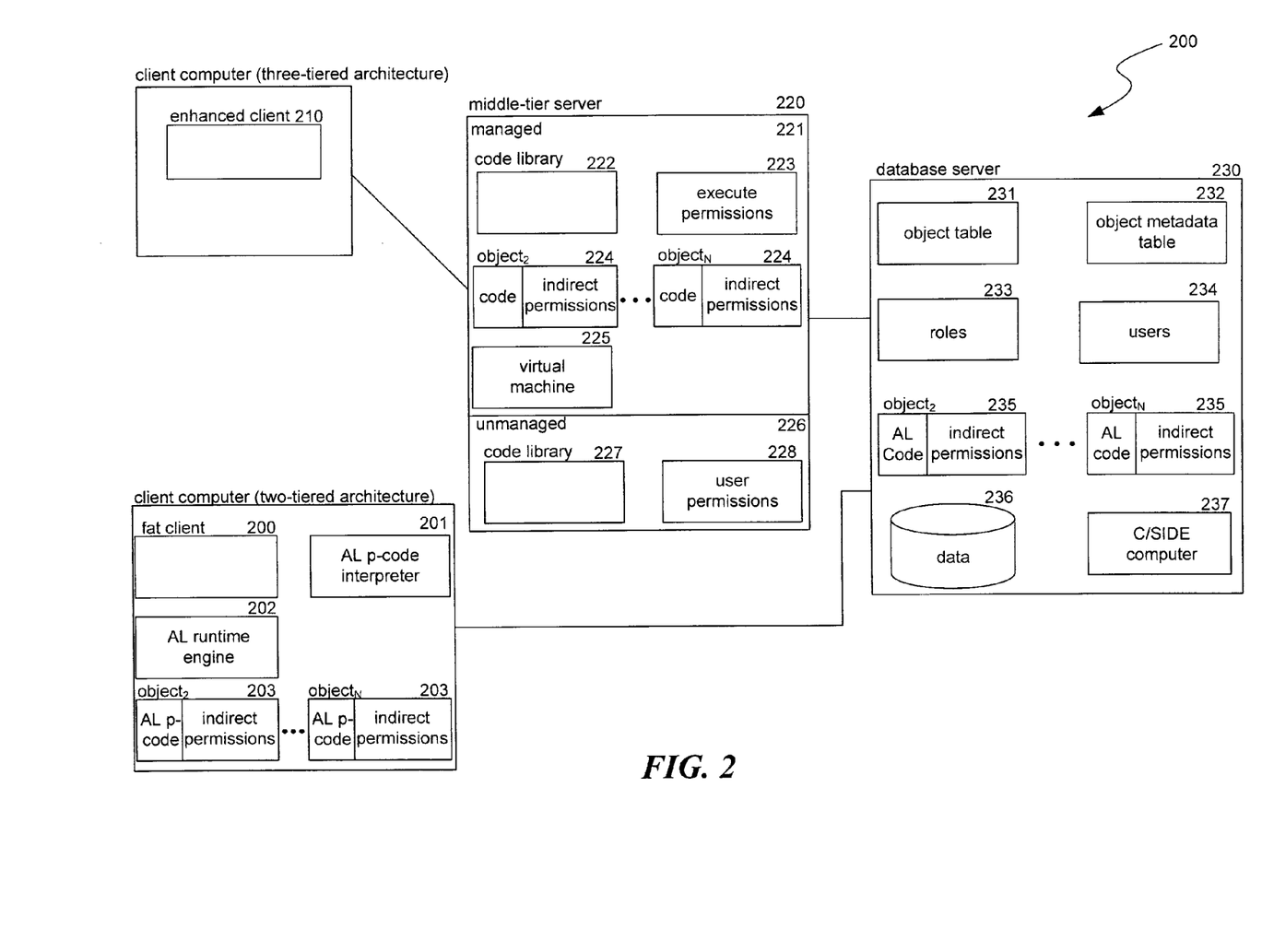
FIG. 2 is a block diagram illustrating components of the system that enforces object permissions in ERP software in some embodiments.

FIG. 2 is a block diagram illustrating components of the system that enforces object permissions in ERP software in some embodiments. Database server 230 includes several components used in managing database objects 235 and access to data stored in data store 236. These components include object table 231, object metadata table 232, roles table 233, users table 234, and client/server integrated development environment ("C/SIDE") compiler 237. In some cases, the ERP database manages access to objects using roles associated with a number of object permissions. For example, an "administrator" role may have permission to access all objects directly while another role has only indirect access to each table object and permission to execute a number of codeunit objects. Roles table 233 provides a mapping of roles to permissions while users table 234 provides a mapping of users to roles. When a user connects to the database server, via enhanced client 210 or fat client 200, the user's permissions are determined by identifying each role with which the user is associated and then identifying the permissions associated with each role. One skilled in the art will recognize that user permissions may be managed in any number of ways. For example, a users table may provide a direct mapping between users and permissions. Objects 235 have associated AL code and associated indirect permissions. The AL code provides the source code necessary for executing various functions provided by the object. For example, a codeunit object may include logic for updating a table while a form object provides code for displaying a form through which a user may manipulate data. The indirect permissions associated with each object indicate the extent to which the object may access another object on a user's behalf. When database server 230 is initiated, C/SIDE compiler 237 compiles the AL code of each object into two different languages: p-code to be used by fat client 210 and C# code to be used by the middle-tier server. The generated p-code is stored in object table 231 along with the indirect permissions of the object while the C# code is stored in object metadata table 232 along with the indirect permissions of the object.

Middle-tier server 220 includes several components used in managing and enforcing object permissions. The middle-tier server includes both an unmanaged portion 226 and a managed portion 221. The unmanaged portion includes code library 227 and user permissions table 228. Unmanaged code library 227 provides logic for interacting with database server 230. User permissions table 228 stores the permissions of users connected via enhanced client 210. Permissions stored in user permissions table 228 are acquired from database server 230 when a user connects to the middle-tier server. The managed portion includes code library 222, execute permissions table 223, and objects 224. Managed code library 222 provides logic for interacting with enhanced client 110 and for checking user and object permissions. Managed code library 222 also includes logic for making interop calls into the unmanaged code library to interact with database server 230. Execute permissions table 223 stores the execute permissions of connected users. Permissions stored in execute permission table 223 may be acquired from user permissions table 228 after user permissions table 228 is populated when a user connection is established. The managed portion also includes virtual machine 225 for executing managed code. Objects 224 are compiled versions of the objects for which source code is stored in object metadata table 232. The source code is retrieved from the database server in response to a request to instantiate an object; the code is then stored and compiled at the middle-tier server. The compiled code is executed in order to instantiate an object. If the code has already been requested and stored at the middle-tier server, an object can be instantiated without retrieving the source code from the database server.

Enhanced client 210 provides a user interface to the three-tiered architecture. Enhanced client 210 interacts with database server 230 via middle-tier server 220. Fat client 200 provides a user interface to a two-tiered architecture and interacts with several components for managing objects, including AL p-code interpreter 201, AL runtime engine 202, and objects 203. Objects 203 are retrieved from object table 231 in response to a user request to instantiate an object. The code for these objects is interpreted by AL p-code interpreter 201.

The computing devices on which the object permission enforcement system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the object permission enforcement system, which means a computer-readable medium that contains the instructions. In addition, the instructions, data structures, and message structures may be stored or transmitted via a data transmission medium, such as a signal on a communications link and may be encrypted. Various communications links may be used, such as the Internet, a local area network, a wide area network, a point-to-point dial-up connection, a cell phone network, and so on.

Embodiments of the object permission enforcement system may be implemented in and used with various operating environments that include personal computers, server computers, handheld or laptop devices, multiprocessor systems, microprocessor-based systems, programmable consumer electronics, digital cameras, network PCs, minicomputers, mainframe computers, computing environments that include any of the above systems or devices, and so on.

The object permission enforcement system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 3:
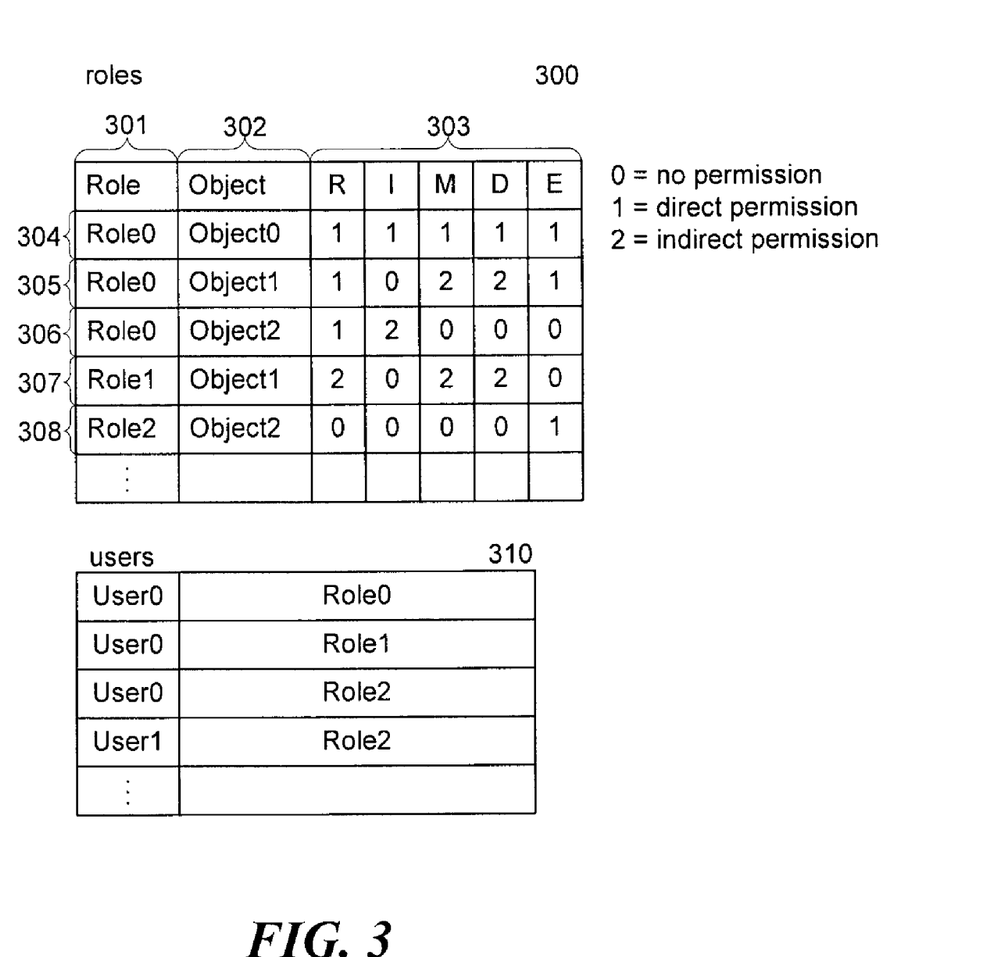
FIG. 3 is a block diagram illustrating the structure of the roles and users tables in some embodiments.

FIG. 3 is a block diagram illustrating the structure of the roles and users tables in some embodiments. Roles table 300 contains permission information for each role with respect to different objects. Each row 304-308 of roles table 300 provides an indication of the permissions associated with a particular role, listed in column 301, and a particular object, listed in column 302. Columns 303 identify the level of permission associated with each access type. In this example, five access types are listed, Read ("R"), Insert ("I"), Modify ("M"), Delete ("D"), Execute ("E"). One skilled in the art will recognize that this access type list may be modified in any manner depending on the needs of a particular ERP application. For each access type, a level of permission is identified with a 0, 1, or 2. A '0' indicates that the associated role does not have permission to access the associated the object in the associated manner. A '1' indicates that the associated role has direct permission to access the associated object in the associated manner. A '2' indicates that the associated role has indirect permission to access the associated object in the associated manner. For example, row 305 indicates that Role0 does not have permission to insert data into Object1, has direct permission to execute and read Object1, and has indirect permission to modify and delete Object1. Users table 310 identifies the roles of which each user is a member. In this example, User0 is a member of Role0, Role1, and Role2 and User1 is a member of Role2. One skilled in the art will appreciate that while FIG. 3 provides an illustration that is easily comprehensible by a human reader, the actual information may be stored using different data structures and data organizations.

Figure 4:
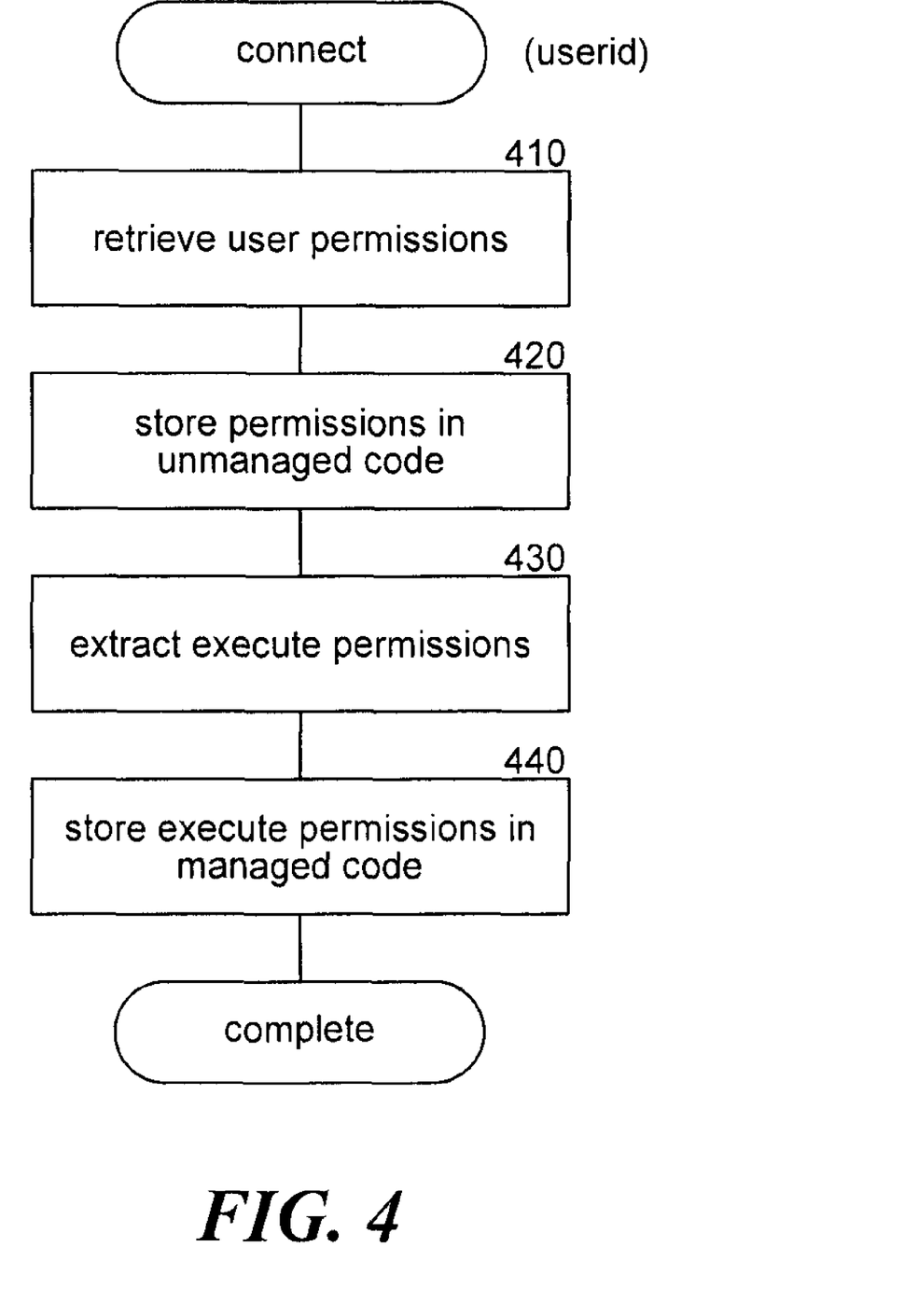
FIG. 4 is a flow diagram illustrating the processing of a connect component of the middle-tier server in some embodiments.

FIG. 4 is a flow diagram illustrating the processing of a connect component of the middle-tier server in some embodiments. The component is passed an indication of a user, such as a userid. The component connects to the database server and retrieves the user's permission information for storage at the middle-tier server. In block 410, the component retrieves the user permissions associated with the received userid from the database server. In block 420, the component stores the received permissions in the unmanaged portion of the middle-tier server. In block 430, the component extracts the execute permissions from the received permissions. In block 440, the component stores the execute permissions in the managed portion of the middle-tier server. The processing of the component then completes.

Figure 5:
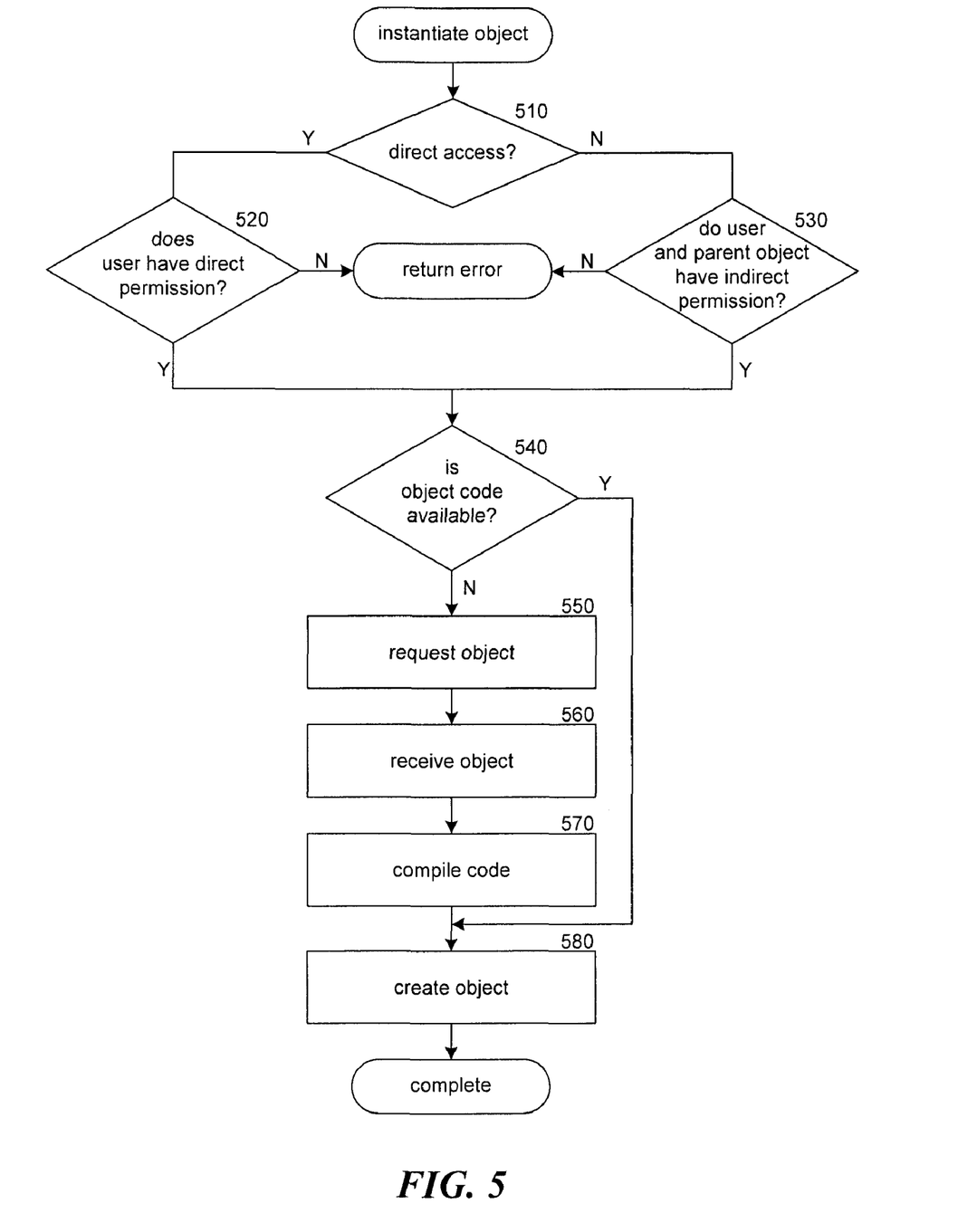
FIG. 5 is a flow diagram illustrating the processing of an instantiate object component of the middle-tier server in some embodiments.

FIG. 5 is a flow diagram illustrating the processing of an instantiate object component of the middle-tier server in some embodiments. The component is invoked in response to a request to access an object. In block 510, if the requested access is a direct access, then processing continues to block 520, else processing continues to block 530. In block 520, if the user does not have permission to access the object directly, then the component returns an error, else processing continues to block 540. In block 530, if the user and the parent object do not have permission to access the object indirectly, then the component returns an error, else processing continues to block 540. In block 540, if the object code of the object to be instantiated is already available at the middle-tier component, then processing continues to block 580, else processing continues to block 550. In block 550, the component requests the object from the database server. In block 560, the component receives the object from the database server, the object including code and permissions associated with the object, and stores the object. In block 570, the component causes the code associated with the object to be compiled. In block 580, the component creates a copy of the object by, for example, invoking a constructor associated with the object. The processing of the component then completes.

Figure 6:
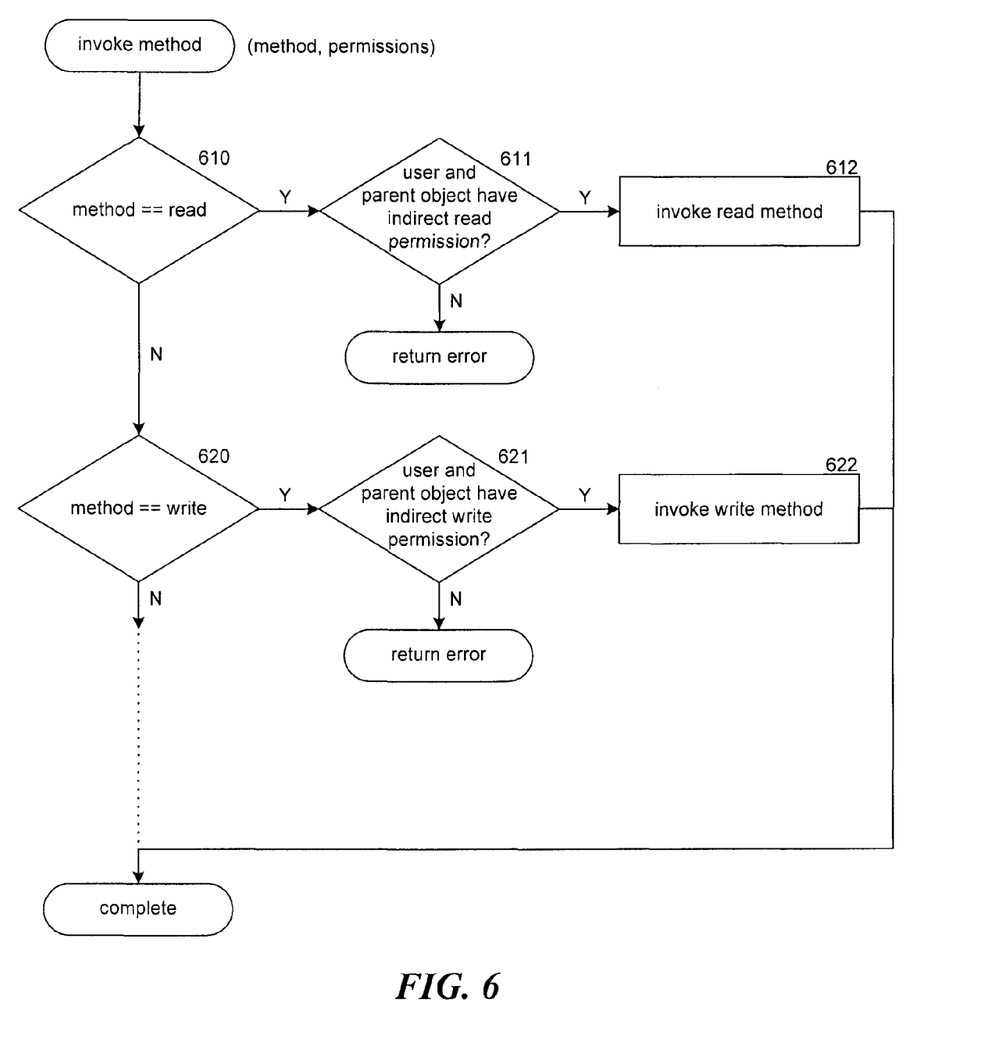
FIG. 6 is a flow diagram illustrating the processing of an invoke method component of the middle-tier server in some embodiments.

FIG. 6 is a flow diagram illustrating the processing of an invoke method component of the middle-tier server in some embodiments. The component is invoked in order to access an object indirectly. The component is passed an indication of a method to be invoked and the permissions associated with the user and the parent object. In block 610, if the method to be invoked is a read method, then the component continues to block 611, else the component continues to block 620. In block 611, if the user and the parent object do not have indirect permission to invoke a read method of the object, then the component returns an error, else, in block 612, the component invokes a read method of the object and then completes. In block 620, if the method to be invoked is a write method, then the component continues to block 621, else the component continues, attempting to identify other methods of the object. In block 621, if the user and the parent object do not have indirect permission to invoke a write method of the object, then the component returns an error, else, in block 622, the component invokes a write method of the object and then completes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method, performed by a middle-tier server, for enforcing Enterprise Resource Planning software object permissions in a three-tiered architecture, the three-tiered architecture comprising a client computer, a database server, and the middle-tier server, the middle-tier server having an unmanaged code portion and a managed code portion, the managed code portion having code that executes under management of a virtual machine and the unmanaged code portion having code that does not execute under management of the virtual machine, the method comprising:
   receiving from the client computer, at the middle-tier server, a request to connect to a database at the database server, the request including an indication of a user;
   sending, from the middle-tier server, the received request to the database server;
   receiving at the middle-tier server, from the database server, user permissions indicating the rights of the user to access objects of the database;
   storing the received user permissions in the unmanaged code portion of the middle-tier server;
   identifying, by the middle-tier server, execute permissions associated with the user within the received user permissions stored in the unmanaged code portion of the middle-tier server, the identified execute permissions indicating the rights of the user to execute objects of the database at the database server;
   storing the identified execute permissions in the managed code portion of the middle-tier server by invoking a callback function of managed code;
   receiving from the client computer, at the middle-tier server, a request to execute a database object;
   accessing, by the middle-tier server, the identified execute permissions stored in the managed code portion of the middle-tier server to determine whether the user has permission to execute the database object; and
   when it is determined, by the middle-tier server, that the user has permission to execute the database object, granting the request to execute the database object,
   wherein the client computer, the database server, and the middle-tier server are remotely located from each other.

2. The method of claim 1 wherein the database server maintains an indication of user permissions for accessing database objects.

3. The method of claim 1 wherein granting the request to execute the database object comprises:
   when it is determined that code for the database object is not available at the middle-tier server,
      sending a request for the database object to the database server, and
      receiving from the database server an indication of the database object.

4. The method of claim 3 wherein the indication of the database object includes source code and a set of indirect permissions associated with the database object, the indirect permissions identifying other objects that the database object may access on behalf of a user.

5. The method of claim 4 further comprising:
   compiling the source code included in the indication of the database object; and
   executing the compiled code.

6. The method of claim 4 wherein the source code is managed source code and wherein the compiled code is executed by a virtual machine.

7. The method of claim 6 wherein the virtual machine is an application virtual machine.

8. The method of claim 4 further comprising:
   receiving from the database object a request to access a second object; and
   when it is determined that the user has permission to access the second object indirectly and that the database object has permission to access the second object indirectly, granting the request to access the second object.

9. A computer-readable storage device containing instructions for enforcing object permissions in a three-tiered architecture, the three-tiered architecture including a client computer, a middle-tier server, and a database server, wherein the instructions, when executed by the middle-tier server, cause the middle-tier server to:
   receive from the client computer a request to connect to the database server, the request including an indication of a user;
   send the received request to the database server;
   receive user permissions from the database server;
   store the received user permissions in an unmanaged code portion of the middle-tier server, the unmanaged code portion having code that does not execute under management of a virtual machine;
   extract execute permissions from the received user permissions;
   store the extracted execute permissions in a managed code portion of the middle-tier server by executing a callback function of managed code, the managed code portion having code that executes under management of the virtual machine;
   receive a request to instantiate a first database object on behalf of a user at the client computer, the user having an associated first set of indirect permissions indicating rights of the user to have the first database object access database objects on behalf of the user;
   in response to receiving the request, send to the database server a request for the first database object;
   receive from the database server an indication of the first database object, the indication including source code and a second set of indirect permissions, the second set of indirect permissions indicating the rights of the first database object to access database objects on behalf of at least one user;

instantiate the first database object;

receive from the first database object a request to access a second database object;

in response to determining that the first set of indirect permissions indicate that the user has permission to access the second database object indirectly and that the second set of indirect permissions indicate that the first database object has permission to access the second database object indirectly, grant the request to access the second database object; and in response to determining that the first set of indirect permissions indicate that the user has permission to access the second database object indirectly and that the second set of indirect permissions indicate that the first database object does not have permission to access the second database object indirectly, deny the request to access the second database object.

10. The computer-readable storage device of claim 9 wherein the instructions, when executed by the middle-tier server, further cause the middle-tier server to:

in response to granting the request to access the second database object, when it is determined that code for the second database object is not available at the middle-tier server, send to the database server a request for an indication of the second database object, receive from the database server an indication of the second database object, the indication including source code and indirect permissions associated with the second database object, and compile the source code for the second database object, and instantiate the second database object.

11. The computer-readable storage device of claim 9 wherein a portion of the middle-tier server logic executes machine-independent code.

12. The computer-readable storage device of claim 9 wherein the instantiated database objects are executed by an application virtual machine.

13. A system for enforcing object permissions in a three-tiered architecture, the three-tiered architecture comprising a client computer, a middle-tier server, and a database server, the system for enforcing object permissions by a method comprising:

receiving a request to connect to the database server, the request including an indication of a user;

receiving user permissions from the database server, the user permissions indicating the rights of the user to access a database object;

storing the received permissions in an unmanaged code portion of the middle-tier server, the unmanaged code portion having code that does not execute under management of a virtual machine;

extracting execute permissions from the stored permissions in the unmanaged code portion of the middle-tier server, the execute permissions indicating the rights of the user to execute database objects;

storing the extracted execute permissions in a managed code portion of the middle-tier server by invoking a callback function of managed code, the managed code portion having code that executes under management of the virtual machine;

receiving a request to instantiate a database object on behalf of the user;

determining whether the user has permission to instantiate the database object;

determining whether code for the database object is stored at the middle-tier server; and instantiating the database object on behalf of the user.

14. The system of claim 13 wherein the received permissions includes direct and indirect permissions.

15. The system of claim 14 further comprising:

when it is determined that code for the database object is not stored at the middle-tier server, sending to the database server a request for an indication of the database object; and receiving from the database server an indication of the database object, the indication including source code for the database object and indirect permissions associated with the database object.

16. The system of claim 15 further comprising:

receiving from the database object a request to access a second database object on behalf of the user; and instantiate instantiating the second database object when it is determined that the user and the database object have permission to access the second database object indirectly.

17. The system of claim 15 wherein instantiating the database object comprises:

compiling the source code for the database object; and executing the compiled code.

18. The system of claim 17 wherein the source code for the database object is compiled to the COMMON INTERMEDIATE LANGUAGE.

19. The system of claim 18 wherein the compiled code is executed by a virtual machine.

20. The computer-readable storage device of claim 9 wherein the instructions, when executed by the middle-tier server, further cause the middle-tier server to, in response to determining that the first set of indirect permissions indicate that the first database object has permission to access the second database object indirectly and that the second set of indirect permissions indicate that the user does not have permission to access the second database object indirectly, deny the request to access the second database object.

* * * * *

UNITED STATES PATENT AND TRADEMARK OFFICE
CERTIFICATE OF CORRECTION

| | |
|---|---|
| PATENT NO. | : 8,190,673 B2 |
| APPLICATION NO. | : 12/182967 |
| DATED | : May 29, 2012 |
| INVENTOR(S) | : Uno Junghans et al. |

It is certified that error appears in the above-identified patent and that said Letters Patent is hereby corrected as shown below:

In column 10, line 31, in Claim 16, before "instantiating" delete "instantiate".

Signed and Sealed this
First Day of January, 2013

David J. Kappos
*Director of the United States Patent and Trademark Office*